(12) United States Patent
Cai et al.

(10) Patent No.: US 11,962,962 B2
(45) Date of Patent: Apr. 16, 2024

(54) SOUND PRODUCING DEVICE AND ELECTRONIC PRODUCT

(71) Applicant: Goertek Inc., Shandong (CN)

(72) Inventors: Xiaodong Cai, Shandong (CN); Linlin Zhang, Shandong (CN); Zhilei Han, Shandong (CN)

(73) Assignee: Goertek Inc., Shandong (CN)

( * ) Notice: Subject to any disclaimer, the term of this patent is extended or adjusted under 35 U.S.C. 154(b) by 199 days.

(21) Appl. No.: 17/628,653

(22) PCT Filed: Dec. 26, 2019

(86) PCT No.: PCT/CN2019/128549
§ 371 (c)(1),
(2) Date: Jan. 20, 2022

(87) PCT Pub. No.: WO2021/027227
PCT Pub. Date: Feb. 18, 2021

(65) Prior Publication Data
US 2022/0256266 A1    Aug. 11, 2022

(30) Foreign Application Priority Data

Aug. 9, 2019 (CN) .......................... 201910736262.7

(51) Int. Cl.
*H04R 1/02* (2006.01)
*B29C 65/08* (2006.01)
*B29C 65/16* (2006.01)
*B29K 83/00* (2006.01)
(Continued)

(52) U.S. Cl.
CPC .............. *H04R 1/025* (2013.01); *B29C 65/08* (2013.01); *B29C 65/16* (2013.01); *B29K 2083/00* (2013.01); *B29K 2105/0061* (2013.01); *B29L 2031/3418* (2013.01)

(58) Field of Classification Search
CPC ........... B29L 2031/3418; B29C 66/542; H04R 1/025; H04R 7/04; H04R 31/006; H04R 2307/025; H04R 1/02; H04R 1/44
See application file for complete search history.

(56) References Cited

U.S. PATENT DOCUMENTS

| 5,293,009 A | 3/1994 | Fleischer |
| 10,932,020 B2 * | 2/2021 | Gu .......................... H04R 9/045 |
| 11,425,978 B2 * | 8/2022 | Chen ...................... A45C 11/22 |

FOREIGN PATENT DOCUMENTS

| CN | 205596284 U | 9/2016 |
| CN | 107197398 A | 9/2017 |
| CN | 110572501 A | 2/2019 |

(Continued)

OTHER PUBLICATIONS

International Search Report dated May 6, 2020 for International Patent Application No. PCT/CN2019/128549.

*Primary Examiner* — Brian Ensey
(74) *Attorney, Agent, or Firm* — Baker Botts LLP

(57) ABSTRACT

Disclosed is a sound producing device and an electronic product, the sound producing device including a front cover and a shell which are bonded together; wherein a diaphragm is accommodated in a cavity enclosed by the front cover and shell, an upper surface of the front cover away from the diaphragm is covered with an elastic sealing piece, and the elastic sealing piece and the front cover are bonded by hot pressing.

14 Claims, 1 Drawing Sheet

(51) Int. Cl.
  *B29K 105/00* (2006.01)
  *B29L 31/34* (2006.01)

(56) References Cited

FOREIGN PATENT DOCUMENTS

| CN | 110636396 A | 12/2019 |
|---|---|---|
| CN | 110891109 A | 3/2020 |

* cited by examiner

SOUND PRODUCING DEVICE AND ELECTRONIC PRODUCT

TECHNICAL FIELD

The present disclosure relates to the technical field of electroacoustic products, in particular to a sound producing device and an electronic product.

BACKGROUND

Electronic products such as smart phones typically have sound producing devices integrated therewith. However, when assembling a sound producing device with an electronic product, in order to prevent water from entering the electronic product through a gap between the sound producing device and a housing of the electronic product and causing functional failure of the electronic product, it is necessary to seal the gap between sound producing device and the housing.

In the prior art, a commonly used method is to sleeve a sealing ring on a side surface of the sound producing device and then assemble it with the electronic product, however, a side structure of the sealing ring cannot precisely match that of the sound producing device, causing a poor sealing performance between the sealing ring and the housing of the electronic product; what is more, a certain amount of interference-fit is required when loading the sealing ring into the electronic product, causing the sealing ring to easily detached in the loading process. In addition, in the prior art, double-shot molding sealing ring is typically used on a side surface of a shell of a sound producing device, but a double-shot molding sealing ring can only be injected using specific materials and specific machines, causing high cost, long manufacturing period and difficulty in testing. Alternatively, a side surface of a shell of the sound producing device is sealed with the electronic product by glue.

However, in the prior art, when assembling a sound producing device with an electronic product, a side surface of the shell of the sound producing device is typically sealed with the electronic product, causing poor sealing performance and a complicated assembling process.

SUMMARY

An object of the present disclosure is to provide a sound producing device and an electronic product with the sound producing device.

According to the first aspect of the present disclosure, provided is a sound producing device including a front cover and a shell which are bonded together; a diaphragm is accommodated in a cavity enclosed by the front cover and shell, an upper surface of the front cover away from the diaphragm is covered with an elastic sealing piece, and the elastic sealing piece and the front cover are bonded by hot pressing.

Alternatively, the elastic sealing piece is made of a rubber material.

Alternatively, the elastic sealing piece is made of a solid silica gel material.

Alternatively, a sound outlet is formed on the front cover, the elastic sealing piece protrudes toward a side away from the front cover, and a protrusion formed by the elastic sealing piece is provided around the sound outlet.

Alternatively, contacts between the front cover and the shell are melting connections.

Alternatively, the front cover is made of a light-transmitting material, and a lower surface of the front cover is provided with a protruding portion, the protruding portion is fixedly connected to the shell by melting.

Alternatively, the melting includes at least one of laser melting and ultrasonic melting.

Alternatively, the diaphragm is made of a rubber material, and the diaphragm and the shell are integrally molded by injection molding.

Alternatively, the diaphragm includes a central portion and a corrugated rim portion concaved downward relative to the central portion.

Alternatively, one end of the corrugated rim portion extends upward and downward along an inner surface of the shell, respectively. Alternatively, the rubber material is one of silicone rubber, AEM rubber and ACM rubber.

Alternatively, the elastic sealing piece and the front cover are bonded by hot pressing, which includes the following steps:

mixing a vulcanizing agent into the solid rubber material to form a blend thereof and then refining the blend in a rubber refiner;

cutting a refined blend of the solid rubber material into pieces of rubber compound with a set size; and placing the front cover into a hot-pressing mold as an insert, and further placing the rubber compound into the hot-pressing mold, and hot-pressing the rubber compound onto the front cover to form the elastic sealing piece.

Alternatively, the solid rubber material is a solid silica gel material.

According to another aspect of the present disclosure, provided is an electronic product, which includes the sound producing device and a housing, the sound producing device is embedded in the housing, and the sound producing device is sealed with the housing using the elastic sealing piece.

The inventor found that, in the prior art, when assembling a sound producing device with the electronic product, a sealing ring or binder is typically provided on a side surface of the shell of the sound producing device to seal it with the electronic product. This method can achieve waterproofing of the electronic product, however, in the prior art, it is usually necessary to set additional cushion foam in order to prevent the sound producing device from colliding with the electronic product in case the electronic product is dropped, resulting in a cumbersome process. According to the present disclosure, the elastic sealing piece provided on the front cover not only can achieve the waterproof performance of the electronic product, but also can function as a cushion between the sound producing device and the electronic product. Therefore, the technical task to be accomplished or the technical problem to be solved by the present disclosure is never thought of or expected by those skilled in the art, and the present disclosure is a novel technical solution.

The present disclosure has the beneficial effects that the present disclosure discloses a sound producing device, the upper surface away from the diaphragm of the front cover is covered with an elastic sealing piece. When assembling the sound producing device with the electronic product, the elastic sealing piece is compressed to enable the sound producing device to be embedded in the electronic product, the elastic sealing piece can achieve waterproof sealing effect between the sound producing device and the electronic product; when the electronic product is dropped, the elastic sealing piece is configured to protect the sound producing device from big impact force, guaranteeing that the acoustic performance of the sound producing device is unaffected.

The front cover and the shell of the sound producing device are bonded by melting. Compared with the gluing mode adopted in the prior art, strength and sealing performance of the sound producing device are improved after the front cover and the shell are melted in the present disclosure, so that the reliability and waterproof performance of the sound producing device in drop tests and the like are ensured, and the phenomenon of poor acoustic performance of the sound producing device caused by glue overflow in the present disclosure does not occur.

Other features and advantages of the present disclosure will become apparent from the following detailed description of exemplary embodiments of the present disclosure with reference to the appended drawings.

BRIEF DESCRIPTION OF THE DRAWINGS

The accompanying drawings which are incorporated in and constitute a part of the description illustrate embodiments of the present disclosure and together with the description thereof serve to explain the principles of the embodiments of the present disclosure.

DETAILED DESCRIPTION OF THE EMBODIMENTS

Figure 1:
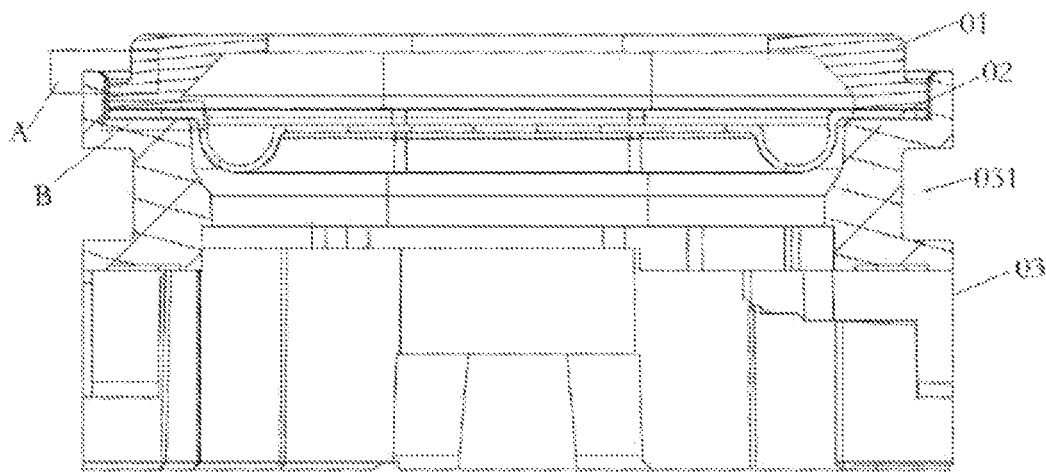
FIG. 1 is a structural diagram of a sound producing device in the prior art.

Various exemplary embodiments of the present disclosure will be described in detail with reference to the accompanying drawings. It should be noted that unless otherwise specified, the relative arrangement, numerical expressions and values of components and steps set forth in these embodiments do not limit the scope of the present disclosure.

The following description of at least one exemplary embodiment is in fact merely illustrative and is in no way intended to limit the present disclosure and its application or use.

Techniques, methods and devices known to those ordinarily skilled in the relevant art may not be discussed in detail, but where appropriate, the techniques, methods and devices should be regarded as part of the authorized description.

In all the examples shown and discussed herein, any specific value should be interpreted as exemplary only and not as a limitation. Thus, other examples of the exemplary embodiment can have different values.

It should be noted that similar reference numerals and letters denote similar items in the following figures, and therefore, once a certain item is defined in one figure, it is not necessary to further discuss it in the following figures.

Figure 2:
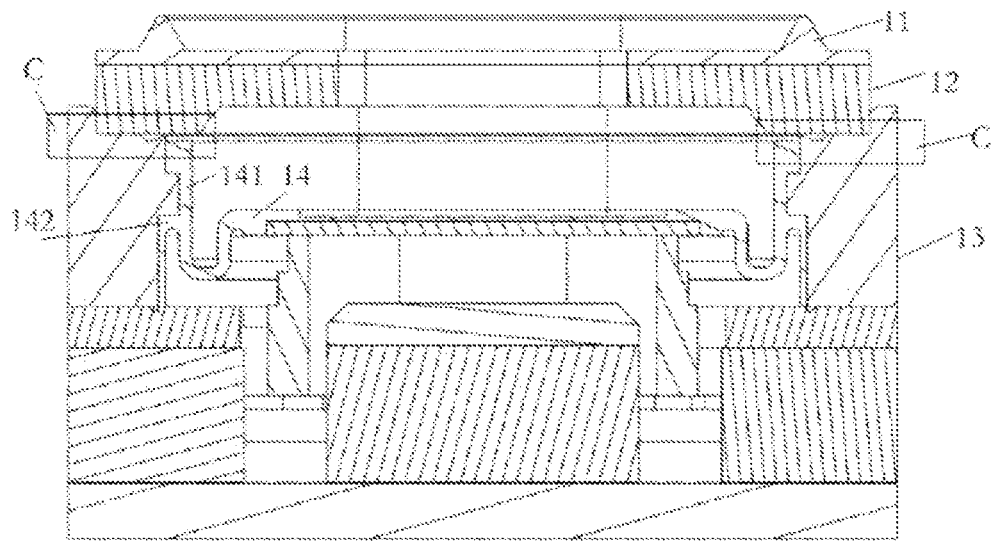
FIG. 2 is a structural diagram of the sound producing device of the present disclosure.

According to one embodiment of the present disclosure, a sound producing device is provided, as shown in FIG. 2, the sound producing device includes a front cover 12 and a shell 13 which are bonded together, a diaphragm 14 is accommodated in a cavity enclosed by the front cover 12 and the shell 13, and the upper surface away from the diaphragm 14 of the front cover 12 is covered with an elastic sealing piece 11. Alternatively, the elastic sealing piece 11 and the front cover 12 are bonded by hot pressing.

Specifically, according to the present disclosure, the upper surface away from the diaphragm 14 of the front cover 12 is covered with the elastic sealing piece 11, and the elastic sealing piece 11 is disposed on the front cover. On the one hand, the elastic sealing piece 11 can seal the sound producing device and improve the sealing performance and waterproof performance of the sound producing device. On the other hand, when the sound producing device is assembled with the electronic product, assembly of the sound producing device and the electronic product 11 can be achieved by compressing the elastic sealing piece. This assembly mode of the present disclosure is convenient for users to operate and simple in assembly mode, and can improve the production efficiency of the electronic product.

Specifically, the elastic sealing piece 11 and the front cover 12 are bonded by hot pressing, and the inventors have discovered that when the front cover 12 and the elastic sealing piece 11 are bonded together by means of the hot pressing mode, a binding force between the front cover 12 and the elastic sealing piece 11 can be improved. For example, if the sound producing device is assembled with the electronic product by compressing the elastic sealing piece 11, the bonding mode in the present disclosure will not cause the elastic sealing piece 11 to detach from the front cover 12 due to the impact force applied to the sound producing device when the sound producing device is dropped, and the elastic sealing piece 11 can reduce the impact force applied to the sound producing device.

Alternatively, the elastic sealing piece 11 and the front cover 12 are bonded by hot pressing, which specifically includes the following steps:

S1: mixing a vulcanizing agent into the solid rubber material to form a blend thereof and then refining the blend in a rubber refiner;

S2: cutting a refined blend of the solid rubber material into pieces of rubber compound with a set size; and S3: placing the front cover into a hot-pressing mold as an insert, and further placing the rubber compound into the hot-pressing mold, and hot-pressing the rubber compound onto the front cover to form the elastic sealing piece.

In step S1, a vulcanizing agent is mixed into the solid rubber material to form a blend thereof and then the blend is refined, the vulcanizing agent being configured for vulcanizing the solid rubber material so that the vulcanized solid rubber material is more elastic and more stable in size and structure.

In one example, the elastic sealing piece is made of rubber materials. Specifically, the elastic sealing piece is made of a solid silica gel material, which the inventors have found to possess excellent tear strength and excellent resilience and thermal aging resistance, enabling sealing of the electronic product. Moreover, when the solid silica gel material is hot pressed with the front cover, a binding force between the solid silica gel and the front cover is better.

In one embodiment, a sound outlet is formed on the front cover 12, the elastic sealing piece 11 protrudes toward a side away from the front cover 12, and a protrusion formed by the elastic sealing piece 11 is provided around the sound outlet. The inventor found that when the elastic sealing piece 11 forms the protrusions, the elastic sealing piece 11 can better weaken the impact force on the sound producing device when the electronic product is dropped by virtue of the deformation of the protrusions. Compared with the sealing ring or cushioning pad with a plane structure in the prior art, the present disclosure can provide better elastic deformation, thereby reducing impact on the sound producing device.

In one example of the present disclosure, contact between the front cover 12 and the shell 13 are melting connections. Compared with the bonding mode of the front cover and the shell adopted in the prior art, the melting mode of the present disclosure can improve the connection strength between the front cover and the shell, and the sealing performance of the sound producing device itself is improved, and the service life of the sound producing device is prolonged at the same time. Although the bonding mode is usually adopted in the prior art, the bonding force will gradually weaken with the service time of the sound producing device, which will degrade the sealing performance of the front cover and the shell.

In one example, a diaphragm 14 is provided in the cavity enclosed by front cover 12 and the shell 13, a surface of the front cover 12 near the diaphragm 14 has a protruding portion, a lower surface of the protruding portion is in contact with an upper end face of the shell 13, and the lower surface of the protruding portion is fixedly connected to the upper end face of the shell 13 by melting. The fixing mode of the present disclosure can play the role of waterproof of the sound producing device. A melting region of the lower surface of the protruding portion and the upper end face of the shell 13 is called Region C, and the melting region of the present disclosure is small in area and has little influence on the stability of the overall structure of the sound producing device. Compared with the bonding mode of the prior art, for example, as shown in FIG. 1, a front cover 01 and a diaphragm 1402 in the prior art are fixed in a bonding mode, wherein the bonding area is called Region A. The front cover 01 and a shell 03 are fixed by bonding, wherein the bonding area is called Region B. In the prior art, there are many bonding areas, the stability of the sound producing device structure is poor, and when the glue is used for bonding, the waterproof performance is poor, and glue overflow phenomenon is easy to occur, which affects the aesthetic feeling of the appearance of the sound producing device.

In one example, the front cover 12 is made of a light-transmitting material, such as a light-transmitting plastic material. In laser melting connection, the front cover 12 is used as a light-transmitting material, and the rear cover is used as an absorbing material. The upper surface of the front cover 12 is irradiated with laser light, and the upper end surface of the shell 13 changes the laser light into heat, so that the upper end surface of the shell 13 is melted, and the protruding portion of the front cover 12 is melted by heat conduction from the melted part of the shell 13, thereby achieving the connection. Compared with the prior art, an intermediate layer is required to realize the connection between the front cover and the shell. The connection mode of the present disclosure does not increase the quality of the sound producing device, and realizes the lightness and minimization of the sound producing device. Compared with the bonding mode of the prior art, the connection mode of the present disclosure does not affect the aesthetic feeling of the appearance of the sound producing device. At the same time, the front cover 12 and the shell 13 have strong sealing performance by adopting the mode as described above.

The front cover 12 is made of a light-transmitting material, such as a light-transmitting plastic material, and the front cover 12 and the shell 13 can also be fixed in an ultrasonic melting mode.

In one embodiment, the diaphragm 14 is made of a rubber material, in particular, one of silicone rubber, AEM rubber and ACM rubber. Compared with the diaphragm 14 made of conventional polymer plastics, the rubber material of diaphragm 14 of the present disclosure has lower Young's modulus, and the diaphragm provided by the present disclosure has a wider elastic range and good flexibility, features larger vibration displacement and loudness, and is not easy to have problems on reliability such as rupture of membranes. When the diaphragm 14 is made into a sound producing device, the diaphragm 14 can effectively suppress polarization in the vibration process, improve the sound quality of the sound producing device, and reduce THD (Total Harmonic Distortion). At the same time, according to the present disclosure, it is possible to increase an edge width of the diaphragm 14, enlarge a radiating area of the sound producing device (the area that drives the diaphragm 14 to vibrate), provide a larger vibration stroke, reduce the stretching of the material itself during vibration, increase the anti-fatigue strength, and ensure the reliability of the sound producing device.

In one example, the diaphragm 14 and the shell 13 are integrally molded by injection molding. In particular, the diaphragm 14 is made of a rubber material and is integrated with the shell 13 as a whole by injection molding. That is, upon molding the diaphragm 14, it is integrally bonded with the shell 13, thereby improving the waterproof effect; and the process of bonding the diaphragm 14 to the shell 13 is omitted in the sound producing device assembly process. Therefore, the assembly process of the sound producing device is simplified, the processing tolerance between the diaphragm 14 and the shell 13 is eliminated, and thus an accumulated tolerance of the assembly is reduced, the assembly positioning accuracy is improved, the production efficiency is improved, the assembly process is reduced, the stability of sound producing device structure gets stronger, and the service life of the sound producing device is prolonged.

The diaphragm 14 includes a central portion and a corrugated rim portion concaved downward relative to the central portion. Compared with the prior art, the corrugated rim portion of the diaphragm 14 of the present disclosure protrudes upward relative to the central portion, thereby increasing the space between the diaphragm 14 and the front cover 12, improving the internal space of the front cavity, and further improving the acoustic performance of the sound producing device.

One end of the corrugated rim portion of the diaphragm 14 extends upward and downward, respectively, along an inner surface of the shell. Specifically, the diaphragm 14 forms a first extension 141 integrally connected with the inner surface of the shell and a second extension 142 integrally connected with the inner surface of the shell. The structural design of the diaphragm 14 of the present disclosure enlarges a contact area between the diaphragm 14 and the shell, and avoids the phenomenon that the sound producing device 14 is easy to fall off during the vibration process of the diaphragm.

According to one embodiment of the present disclosure, when assembling the sound producing device with the housing of the electronic product, the sound producing device is disposed inside the housing of the electronic product by compressing the elastic sealing piece 11. The elastic sealing piece 11 is disposed between the sound producing device and the housing of the electronic product, and is capable of waterproofing and sealing the electronic product. By contrast, in the prior art, for example, as shown in FIG. 1, a concave area 031 is provided on an outer side wall of the shell 03, and a sealing ring or an adhesive is provided in the concave area 031 to achieve the sealing between the sound producing device and the housing of the electronic product. When providing the sealing ring, the structure of the sealing ring is usually annular. When a shape of the concave area 031 does not match the structure of the sealing ring, the sealing effect of the sealing ring is not good, and the electronic product has undesirable waterproof performance. When providing the adhesive, a gap sealing method for example is used for sealing, which is poor in its feasibility because it is difficult to completely fill the small gap with glue, leading to a poor sealing effect. What is more, after gluing, the product cannot be reworked, and its parts cannot be replaced by after-sale service.

Compared with providing components on a side surface of the sound producing device to realize sealing between the sound producing device and the electronic product, the present disclosure overcomes the following technical prejudice: because the front cover is usually provided with a sound outlet and serves as a front cavity of the sound producing device for transmitting the vibration sound, people take for granted that covering any parts onto the front cover will affect the propagation of the vibration sound. By contrast, the present disclosure covers the elastic sealing piece onto the front cover, the elastic sealing piece and a portion of the front cover where the sound outlet is disposed being hollowed out, or protruding portions of the elastic sealing piece being disposed around the sound outlet. The inventor found that such arrangement of the present disclosure does not affect the propagation of the vibration sound, and the elastic sealing piece can further function as a cushioning component when the sound producing device is assembled with the electronic product. For example, when the electronic product is dropped, the sound producing device will be subjected to great impact force, which will affect the stability of the internal structure of the sound producing device and the acoustic performance of the sound producing device. In order to solve this technical problem, additional cushion foam is commonly provided to reduce impact on the sound producing device; by contrast, the present disclosure provides the elastic sealing piece that can solely accomplish this function, and the elastic sealing piece after compression can function as a cushion in the sound producing device and the electronic product, thereby protecting the sound producing device from strong impact force in case the electronic product is dropped, and reducing production cost since there is no need to paste cushioning foam separately.

Provided in one embodiment of the present disclosure is an electronic product, which includes the sound producing device and a housing, the sound producing device being embedded in the housing, and the sound producing device being sealed with the housing using the elastic sealing piece.

Specifically, the elastic sealing piece is compressed to realize assembling of the sound producing device and the housing of the electronic product, and is configured for both cushioning and sealing when being compressed to assemble the sound producing device into the housing.

While some specific embodiments of the present disclosure have been described in detail by way of example, it should be understood by those skilled in the art that the above examples are for illustration only and are not intended to limit the scope of the present disclosure. It will be apparent to those skilled in the art that modifications to the above embodiment can be made without departing from the scope or spirit of the present disclosure. The scope of the present disclosure is limited by the appended claims.

What is claimed is:

1. A sound producing device comprising a front cover and a shell bonded together; wherein a diaphragm is accommodated in a cavity enclosed by the front cover and shell, an upper surface of the front cover away from the diaphragm is covered with an elastic sealing piece, and the elastic sealing piece and the front cover are hot pressed bonded.

2. The sound producing device of claim 1, wherein the elastic sealing piece is made of a rubber material.

3. The sound producing device of claim 2, wherein the elastic sealing piece is made of a solid silica gel material.

4. The sound producing device of claim 1, wherein a sound outlet is formed on the front cover, the elastic sealing piece protrudes toward a side away from the front cover, and a protrusion formed by the elastic sealing piece is provided around the sound outlet.

5. The sound producing device of claim 1, wherein contacts between the front cover and the shell are melting connections.

6. The sound producing device of claim 5, wherein the front cover is made of a light-transmitting material, and a lower surface of the front cover is provided with a protruding portion, the protruding portion comprises a melted portion fixedly connected to the shell.

7. The sound producing device of claim 5, wherein the melting connections include at least one of a laser melted connection and an ultrasonic melted connection.

8. The sound producing device of claim 1, wherein the diaphragm is made of a rubber material, and the diaphragm and the shell are integrally injection molded.

9. The sound producing device of claim 8, wherein the diaphragm includes a central portion and a corrugated rim portion concaved downward relative to the central portion.

10. The sound producing device of claim 9, wherein one end of the corrugated rim portion extends upward and downward along an inner surface of the shell, respectively.

11. The sound producing device of claim 8, wherein the rubber material is one of silicone rubber, AEM rubber and ACM rubber.

12. The sound producing device of claim 1, wherein the hot press bonding comprises bonding by:
    mixing a vulcanizing agent into the solid rubber material to form a blend thereof and then refining the blend in a rubber refiner;
    cutting a refined blend of the solid rubber material into pieces of rubber compound with a set size; and
    placing the front cover into a hot-pressing mold as an insert, and further placing the rubber compound into the hot-pressing mold, and hot-pressing the rubber compound onto the front cover to form the elastic sealing piece.

13. The sound producing device of claim 12, wherein the solid rubber material is a solid silica gel material.

14. An electronic product, comprising:
    the sound producing device of claim 1; and
    a housing;
    wherein the sound producing device is embedded in the housing, and the sound producing device is sealed with the housing using the elastic sealing piece.

* * * * *